United States Patent Office 3,557,255
Patented Jan. 19, 1971

3,557,255
PIVALOLACTONE-DIENE BLOCK COPOLYMERS
AND THEIR PREPARATION
William H. Sharkey, Wilmington, Del., assignor to E. I.
du Pont de Nemours and Company, Wilmington, Del.,
a corporation of Delaware
No Drawing. Filed Mar. 21, 1969, Ser. No. 809,418
Int. Cl. C08f 15/40, 19/08
U.S. Cl. 260—879                                    14 Claims

ABSTRACT OF THE DISCLOSURE

Block copolymers of the ABA type are described in which both A units are polypivalolactone, or optionally one A unit is polystyrene, and the B unit is a polydiene (isoprene or butadiene). The block copolymers are useful elastomers which require no vulcanization. When the two A units are the same, the polydiene unit is first formed with two "living" anionic groups, e.g., from sodium or lithium, and polypivalolactone formed from the ends. When polystyrene is present, it is first formed with n-butyl-lithium, the diene polymerized on the "living end" of the polystyrene, and the polypivalolactone produced on the "living end" of the diene.

BACKGROUND OF THE INVENTION (1) Field of the invention

This invention relates to, and has as its principal object provision of, block copolymers derived from pivalolactone,

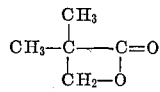

More specifically, the invention is concerned with novel block copolymers of the structures polypivalolactone-polydiene-polypivalolactone and polystyrene-polydiene-polypivalolactone which are useful as thermoplastics, especially thermoplastic elastomers which need no vulcanization, and to novel methods for the preparation of the same.

(2) Description of the prior art

The polymerization of lactones via the ring-opening action of basic catalysts is known, although acid initiation or cationic polymerization is usually employed (Lenz, Organic Chemistry of Synthetic High Polymers, Interscience Publishers, 1967, Chapter 13). Homopolymerization of pivalolactone by means of phosphines, arsines and stibines is also known (U.S. Pat. 3,268,486 and U.S. Pat. 3,412,073).

Block copolymerization, with which the present invention is concerned, is a more recent development than random copolymerization. The block copolymerization of caprolactones and oxiranes, such as ethylene oxide, by means of Group II and III organometal catalysts has, for example, been reported (U.S. Pat. 3,312,753). The science of block copolymerization is centered almost entirely in the field of vinyl polymers and is founded in large part on the discovery of stable "living" vinyl polymers [Szwarc, Nature, 178, 1168 (1956)].

A "living" polymer has an end group that can act as the initiator for polymerization of an added vinyl monomer and as the site for attachment of the resultant new polymer chain. A block copolymer is formed when the added monomer is different from that which forms the "living" polymer (Lenz, loc. cit.). A two-segment block copolymer thus produced is known as an AB block copolymer. Among the forms of vinyl block copolymers is the three-segment ABA type prepared by addition of a monomer A to a "living" B polymer which has two initiator-end groups each of which propagates the formation of an attached A polymer segment (U.S. Pats. 3,231,635 and 3,265,765). Anionic initiators are commonly used in the preparation of vinyl block copolymers.

Block copolymers of the ABA type in which the A blocks are crystalline thermoplastic segments derived from a vinyl monomer such as styrene and the B block is an elastomeric segment derived from a 1,3-diene monomer such as butadiene are known to be very useful thermoplastic elastomers which do not require curing by vulcanization [U.S. Pats. 3,231,635 and 3,265,765; Zelinski and Childers, Rubber Chemistry and Technology, 41, 161 (1968)].

Thermoplastic-elastomeric ABA block copolymers of the type exemplified by the products of this invention, i.e., mixed vinyl/polylactone copolymers, have not been reported previously.

SUMMARY OF THE INVENTION

The products of the present invention are $A_l B_m C_n$ block copolymers in which the A segment is polypivalolactone or polystyrene, the B segment is a poly-1,3-diene, the C segment is polypivalolactone, and $l$, $m$ and $n$ are integers representing the respective numbers of A, B and C monomer units in the copolymer. The structures of the individual segments can be represented by the following formulas:

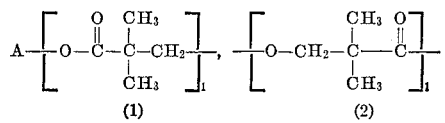

or

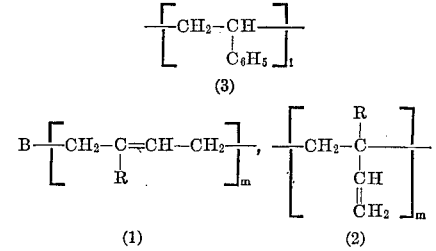

or

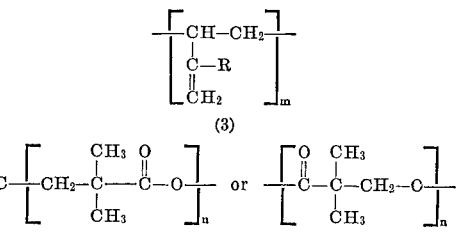

R in structure B is hydrogen or methyl, and $l$, $m$ and $n$ are whole numbers defined by ratios of $l:m$ and $n:m$ in the range 5:10 to 100:6000 (mathematically reducible to 1:2 to 1:60).

The block copolymers of the invention are produced by methods based on the discovery that polymerization of pivalolactone can be initiated by a "living" anionic end group of a polymeric 1,3-diene, and that the resulting polypivalolactone is attached to the diene polymer at the site of the initiating end group. There are two methods of operation, one involving a sequence of two steps and the other, three steps.

The two-step sequential process is used for preparing ABC block copolymers wherein the A segment is polypivalolactone, i.e., when the A and C segments are alike.

The first step is the formation of the B or central segment by initiation of polymerization of a 1,3-diene (butadiene or isoprene) with a metal of Group I of the Periodic System (lithium or sodium) or with a di(group I) metallo α-methylstyrene tetramer. The resultant "living" poly-1,3-diene has two lithium or two sodium atoms attached to carbons at opposite ends of the polymer chain.

Step 1:

The second step involves simultaneous formation of the two A and C segments through addition of pivalolactone and consequential initiation of its polymerization at each of the anionic end groups.

Step 2:

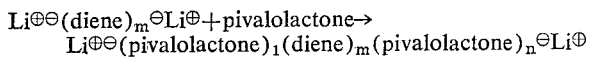

The three-step sequential process is used for preparing ABC block copolyers wherein the A segment is polystyrene. The first step involves formation of the A segment by polymerization of styrene with n-butyllithium as initiator in nonpolar solvent, such as n-hexane.

Step 1:

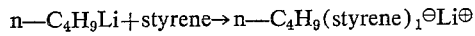

The second step involves formation of the B segment by addition of a 1,3-diene monomer (butadiene or isoprene) and initiation of its polymerization by the "living" end group on the preformed polystyrene which is also done in a nonpolar solvent.

Step 2:

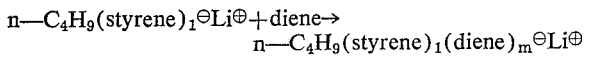

The third step involves addition of pivalolactone and consequent formation of the C segment at the "living" end of the B or poly-1,3-diene segment.

Step 3:

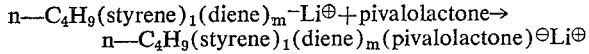

The ABC block copolymer so obtained is then treated with methanol or other solvent to free it of salts and other impurities by washing with methanol.

DETAILS OF THE INVENTION (1) The $A_lB_mC_n$ copolymers.—The preferred products of the invention are pivalolactone-diene-pivalolactone block copolymers (A=C and $l=n$ in the above general formula) in which the crystalline A and C blocks are polypivalolactone segments represented as having recurring units of the formula

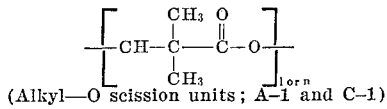

(Alkyl—O scission units; A–1 and C–1)

and the thermoplastic B block is a polydiene segment of at least 90% cis-1,4-structure, represented as having recurring units of the formula

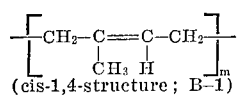

(cis-1,4-structure; B–1)

These preferred copolymers are highly resilient thermoplastics. They contain from about 3% to about 65% by weight of polypivalolactone (1:$m$ and $n$:$m$ ratios in the range 1:2 to 1:60) and have two glass transition temperatures, the higher one ranging up to about 140° C. and the lower one ranging down to about −60° C. They are soluble in hydrocarbon solvents and the usual relatively strong solvents such as halogenated hydrocarbons, but are insoluble in methanol. They are useful as tough, resilient plastics or elastomers in the form of molded objects or in the form of films made by extrusion or by casting from solution.

The block copolymers of the invention include pivalolactone-1,3-diene-pivalolactone block copolymers in which the A and C (polypivalolactone) blocks have recurring units which can be represented by the formula

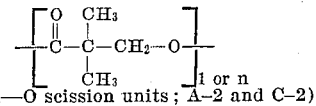

(Acyl—O scission units; A–2 and C–2)

They also include copolymers in which the B (polyisoprene or polybutadiene) blocks may have recurring units which can be represented by the formulas

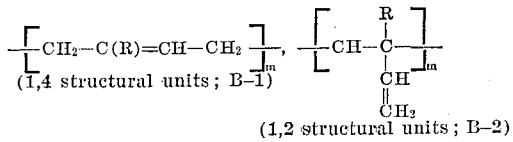

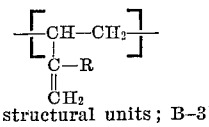

(3,4 structural units; B–3)

in which R is hydrogen or methyl. When R is hydrogen, the 1,2 and 3,4 structural units are identical.

The properties of the copolymers vary according to the proportions of the different copolymer segments. Copolymers having relatively high proportions of A and C segments (1:$m$ and $n$:$m$ ratios in the range 1:2 to 1:25) approach conventional crystalline thermoplastic polymers in their properties and are useful generally as resilient thermoplastics. Copolymers having relatively high proportions of B segments (1:$m$ and $n$:$m$ ratios in the range 1:25 to 1:60) approach conventional poly-1,3-diene elastomers in their properties and are useful generally as elastomers, which may or may not be cured by vulcanization as desired.

(2) The poly - 1,3 - diene segment.—Elastomeric poly-1,3-dienes having lithio or sodio "living" end groups can be prepared by means of appropriate metal alkyl initiators, e.g., n-butyllithium, dilithiumstilbene [U.S. Pats. 3,149,182 and 3,231,635; Zelinski et al., Rubber Chemistry and Technology, 41, 163 (1968)]. When a monometallic initiator such as n-butyllithium is used, the polydiene has a single anionic end group, and when a dimetallic initiator such as dilithiumstilbene is used the polydiene has two anionic end groups. Disodium α-methylstyrene tetramer [William and Richard, Chem. Comm. 414 (1967)] is an especially good dianionic initiator. Dianionic polydienes can also be made directly from the alkali metal and the monomer (Zelinski et al., loc. cit.).

The polymerization of 1,3-dienes with lithium and sodium metal or metal alkyls can be carried out at ambient temperature and pressure, and it can also be accomplished at higher or lower temperatures and under higher pressure as desired.

Solvents are usually employed in 1,3-diene polymerization systems, and the rate of reaction and mechanism of polymerization may be dependent upon the nature of the solvent. Use of lithium catalysts in a nonpolar solvent or in the absence of a solvent other than the monomer itself is generally most favorable to formation of cis-1,4 structural units (Formula B–1), especially in the case of isoprene. Use of sodium catalysts and/or polar solvents tends to favor polymerization through only one of the double bonds in the diene, and in the case of isoprene to formation of 3,4 structural units (Formula B–3) [U.S. Pat. 3,231,635; Stavely, et al., Ind. and Eng. Chem. 48, 778 (1956)].

Since the polydiene units of cis-1,4 structure are generally preferred in block copolymers, use of lithium initiators and nonpolar solvents would be preferred in the process steps of forming the polydiene segments of the copolymers of the invention. Such is the case in the three-step sequential process mentioned above for preparing the block copolymer in which segment A is polystyrene. However, dianionic polydienes ordinarily are not readily prepared in nonpolar media, though they are quite readily obtained in polar systems which are not favorable to the formation of cis-1,4-polyisoprene (U.S. Pat. 3,231,635).

"Living" cis-1,4-polydiene formed by reaction of lithium metal and pure butadiene or isoprene in the absence of a solvent (Stavely, et al., loc. cit.), or by means of dilithium α-methylstyrene tetramer as initiator in n-hexane, reacts with pivalolactone to form a block copolymer which is much stronger than a copolymer prepared in a corresponding two-step procedure in which the initial "living" polydiene unit is prepared with butyllithium as initiator. The latter copolymer has strength typical of a two-segment AB block copolymer whereas the former copolymer has strength typical of a three-segment ABA block copolymer. Accordingly, the preferred process of preparing the block copolymers of the invention in which both the A and C segments are polypivalolactone and the B segment is a polydiene is the two-step sequential process mentioned above wherein the first step involves no solvent other than a highly purified hydrocarbon or an excess of the monomer.

In the absence of chain-terminating substances the diene polymerization reaction goes to completion and all of the 1,3-diene monomer is incorporated into polymer units. The molecular weight of such polymer units is proportional to the relative equivalent amounts of monomer and initiator in the reaction system. In the practice of this invention, the initiator is used in the proportion of about 0.05 to about 0.00017 mole equivalent of metal per mole of diene monomer in order to provide diene polymer segments containing from about 20 to about 6000 monomer units, respectively.

(3) The polypivalolactone segment(s).—Polymerization of pivalolactone can be initiated by litho or sodio "living" end groups on 1,3-diene polymers. Such 1,3-diene polymers can be prepared by means of lithium or sodium metal or lithium or sodium alkyls as initiators. In the absence of terminating agents, i.e., reactants that would destroy the metallic end groups, the 1,3-diene polymers remain "alive" and capable of initiating further polymerization. As indicated above, the diene polymer may be a homopolymer having two "living" anionic end groups at opposite ends of the polymer chain, or it may be a polydiene segment of a preformed styrene-diene block copolymer having one "living" anionic end group attached to the polymer chain at the end opposite that attached to the polystyrene block. The polypivalolactone formed by such polymerization is a segment of a diene-pivalolactone block copolymer unit. In the absence of substances, other than monomeric pivalolactone, that can react with "living" initiator end groups (e.g., terminating agents), all of the monomeric pivalolactone present enters into the formation of polypivalolactone. Accordingly, the molecuar weight of a polypivalolacetone unit normally depends upon the relative equivalents of monomeric lactone and "living" end groups in the reaction mixture. In the practice of this invention, pivalolactone monomer is used in the proportion of about 1.0 to about 0.033 mole per mole of diene monomer. Preferably the polypivalolactone segments contain from about 5 to about 1000 monomer units, respectively.

The formation of polypivalolactone as described above is usually carried out at ambient temperature and pressure, but it can also be carried out at higher or lower temperatures and under higher pressure, if desired.

Solvents are usually employed in forming the polypivalolactone blocks of the copolymers of the invention. However, it is important to recognize that the solvent can influence the course of lactone polymerization. As a general rule, the mechanism of pivalolactone polymerization is established in the first or initiation stage of the polymerization, and the subsequent or propagation stage continues by the thus-established mechanism. The mechanism of the polymerization reaction can be determined by the nature of the solvent present when initiation occurs, but is generally unaffected by the solvent during the propagation stage. Nonpolar solvents, such as hydrocarbons (e.g., cyclohexane, benzene, toluene), foster the alkyl—O fission mechanism with lithium and sodium anionic initiators, and this mechanism produces the recurring units having the Formulas A–1 and C–1. Polar solvents, such as tetrahydrofuran, ethylene glycol dimethyl ether, diethylene glycol dimethyl ether, tetraethylene glycol dimethly ether, dioxane and anisole, foster the acyl—O fission mechanim, and this mechanism produces recurring units having the Formulas A–2 and C–2. Polar solvents, because of their solvating effect, generally favor more rapid rates of lactone polymerization than do nonpolar solvents. Since polypivalolactone structural units of the alkyl—O fission type (Formulas A–1 and C–1) are preferred, exclusive use of nonpolar solvents is preferred in the initiation stage of pivalolactone polymerization. Also, since a reasonably rapid rate of polymerization is desired, addition of a polar solvent during the propagation stage of pivalolactone polymerization is a preferred aspect of the overall process.

(4) The polystyrene segment.—Preparation of block copolymers of the invention in which the A segment is polystyrene (structural units of Formula A–3) involves anionic polymerization of styrene with a lithium or sodium alkyl initiator as the first step in the three-step sequential process. The crystalline nature of such polystyrene and its preparation as a "living" polymer with an anionic end group is well known [U.S. Pats. 3,149,182, 3,231,635, and 3,265,765; Zelinski et al., Rubber Chemistry and Technology, 41, 161–179 (1968)]. The diene and pivalolactone segments are then formed by successive addition of the diene and pivalolactone, the diene polymer chain in this instance having a single anionic end group. Process conditions may remain unchanged except for the addition of the successive monomers (see Example 9, below).

EMBODIMENTS OF THE INVENTION

There follow some nonlimiting examples which illustrate the invention in greater detail.

EXAMPLE 1

Polypivalolactone-polyisoprene-polypivalolactone

This example illustrates the polymerization of isoprene with lithium powder to form a polyisoprene that has alkyllithium on both ends of the polymer molecule. This bis-lithio polymer is then reacted with pivalolactone to form an ABA block copolymer in which the A blocks are polypivalolactone and the B block is an elastomeric polyisoprene segment of predominantly cis-1,4 structure.

Into a pressure bottle that had been carefully dried and swept with helium to remove all traces of air were introduced 0.1 g. (0.014 mole) of powdered lithium followed by about 70 g. (1.03 mole) of isoprene, all under helium. The mixture was stirred by means of a glass-coated magnetic stirrer bar at 35–40° C. for a little over 5 hours at which point a reaction started, as indicated by an increase in viscosity of the liquid and a change in appearance of the lithium powder from bright metallic to dull gray. The temperature was reduced to 30–33° C. and stirring continued for about 1 hour, at which point viscosity was so great that stirring occurred with difficulty. Then 3 ml. (0.03 mole) of pivalolactone was added followed by the addition of 15 ml. of dry tetrahydrofuran. This mixture was stirred for an additional 30 minutes and was then treated with a large excess of methanol. White polymer, which precipitated from the methanol solution, was isolated and dried. It amounted to 2 g. Analysis indicated an oxygen content (3.84, 3.70) which corresponds to a pivalolactone-isoprene-pivalolactone block copolymer in which the total pivalolactone content is about 12% by weight.

The pivalolactone-isoprene-pivalolactone (PIP) block copolymer prepared above was hot-pressed at 130° C. and 5000 p.s.i. to form an elastomeric film. This film was found to have two glass transition temperatures, one at −62° C., which is the isoprene transition, and the other at 138° C., which is associated with the polypivalolactone blocks. Thus, the product is an elastomer that has the desirable property of retaining flexibility at very low temperatures and also, because of the second high transition point, of retaining strength at temperatures as high as 100° C. Stress-strain measurements showed that the film had a tensile strength of 99 p.s.i., an elongation of 700–800%, and an initial modulus of 288 p.s.i.

These properties may be contrasted with those of the styrene-isoprene-styrene (SIS) block copolymers that have been described in the literature. The SIS block copolymers have glass transition points of −65° C. and about 90° C. The strength of SIS copolymers at elevated temperatures is therefore less than that of the PIP copolymers and the former are not recommended for use above 60° C.

EXAMPLE 2

Polypivalolactone-polyisoprene-polypivalolactone (Pivalolactone)$_{82}$(isoprene)$_{2150}$(pivalolactone)$_{82}$ Isoprene was polymerized as described in Example 1, except that in this instance the reaction started after 7 hours of stirring. Stirring was done at 35–40° C. until the lithium powder present turned a dark grey. At this point, the temperature was reduced at 30–33° C. When the reaction mixture became too thick for stirring by means of a glass-covered magnetic stirrer bar, 2 ml. of pivalolactone was added. A slight decrease in the viscosity occurred. Then 10 ml. of dry tetrahydrofuran was added and the mixture stirred vigorously for 15 minutes, followed by addition of excess methanol.

The polymer that separated from the methanol solution weighed about 1 g. After drying, it was pressed into a self-supporting film. The oxygen content of this polymer was 3.22, 3.26%; which corresponds to about 10% by weight of pivalolactone. Molecular weight measurements indicated a $\overline{M}_N$ of 163,200, and the inherent viscosity (0.1% solution in toluene at 25° C.) was 5.11. Inherent viscosity of a 0.1% solution in tetralin at 125° C. was 0.52.

EXAMPLE 3

Polypivalolactone-polyisoprene-polypivalolactone

Isoprene was polymerized as described in Example 1. When the polymerizing mixture became sufficiently viscous that stirring was difficult with the magnetic stirrer, 5 ml. of pivalolactone was added followed by 10 ml. of dry tetrahydrofuran. This mixture became quite viscous after 15 minutes and 20 ml. of dry n-hexane was then added to improve fluidity. This mixture was stirred for an additional 30 minutes and then excess methanol was added. About 2 g. of block copolymer was isolated from the methanol solution. The product was dried and pressed into a film at 140° C. and 2000 p.s.i. Analysis indicated 8.44, 8.64% oxygen, which corresponds to about 24% pivalolactone by weight. Films of this polymer had a tensile strength of about 80 p.s.i. at an elongation of 450–850%, and an initial modulus of 400–570 p.s.i.

EXAMPLE 4

Polypivalolactone-polybutadiene-polypivalolactone

About 40 ml. of dry butadiene was added to a reaction flask containing 200 ml. of dry tetrahydrofuran that contained 0.05 g. of powdered lithium and had been cooled in liquid nitrogen. The reaction flask was allowed to warm to about −80° C., and the contents was slowly stirred by means of a glass-coated magnetic stirrer bar. The temperature was allowed to rise slightly above −80° C., whereupon the reaction mixture assumed a yellow color. After 30 minutes, 4 ml. of pivalolactone was introduced by means of a syringe. The yellow color immediately disappeared. The temperature of the flask was allowed to increase to room temperature, and the mixture was stirred for an aditional 10 minutes and then poured into an excess of methanol. Polymer isolated from the methanol solution formed strong films and was a pivalolactone-butadiene-pivalolactone block copolymer.

EXAMPLE 5

Polypivalolactone-polyisoprene-polypivalolactone

This example illustrates the preparation of pivalolactone-isoprene-pivalolactone block copolymers by initiation with a modified Szwarc living polymer initiator, dilithium α-methylstyrene tetramer, formed by reaction of lithium with α-methylstyrene in a mixture of n-hexane and tetrahydrofuran. The purpose of this experiment was to remove as much tetrahydrofuran as possible after formation of the initiator in order to favor 1,4-polymerization of the isoprene.

A small amount of lithium powder was transferred to a dried Pyrex® pressure bottle that had been thoroughly swept with helium to remove all traces of air. About 5 ml. of tetrahydrofuran was transferred into this flask, and then 25 μl. of α-methylstyrene was added. A red color developed in a few minutes, and after 15 minutes' stirring, the entire reaction mixture was an intense red. The tetrahydrofuran and excess α-methylstyrene were removed in vacuo to leave a moist solid, then 200 ml. of n-hexane was added followed by addition of 20 ml. (13.6 g., 0.2 mole) of dry isoprene. The red color of the initiator disappeared upon addition of the isoprene, and after being stirred overnight at room temperature the solution became very viscous. A solution of 4 ml. (0.04 mole) of pivalolactone in 10 ml. of n-hexane was then added to the reaction mixture with stirring, and stirring was continued for 30 minutes with slight warming. The reaction mixture was poured into an excess of methanol, whereupon a white solid separated. The white solid was dried and then hot-pressed into a film.

The film was very resilient. Infrared analysis indicated that the product contained appreciable amounts of 1,4-isoprene units and a small amount of pivalolactone.

EXAMPLE 6

Polypivalolactone-polyisoprene-polypivalolactone

This example illustrates initiation of isoprene polymerization by sodium metal in tetrahydrofuran. This reaction is believed to give a polyisoprene molecule having alkylsodium on each end of the polymer chain.

Dry tetrahydrofuran (450 ml.) was added to a Pyrex® pressure bottle in which a sodium mirror had been previously deposited on the walls of the flask. Dry isoprene (10–12 ml.) was then introduced into the pressure vessel containing the sodium mirror. An orange-yellow color formed as soon as the isoprene contacted the sodium mirror. The viscosity of the mixture steady increased, and after 30 min., 2.5 ml. of pivalolactone in 20 ml. of tetrahydrofuran was added. The temperature of the reaction mixture, which had been kept at −78° C., was allowed to rise slowly to room temperature. After being stirred for 15 min., at room temperature, the reaction mixture was added to an excess of methanol, and the polymer that precipitated was washed with methanol and dried. It was a white solid amounting to 8 g. and contained an appreciable amount of pivalolactone, as indicated by a strong C=O peak in the infrared spectrum. A tough film was obtained by hot pressing.

EXAMPLE 7

Polypivalolactone-polyisoprene-polypivalolactone

A sodium mirror was formed on the walls of a Pyrex® flask that had been previously dried and thoroughly purged of air. The flask was kept under vacuum during deposition of the sodium mirror. After the flask had cooled to room temperature and it was cooled further in liquid nitrogen, dry tetrahydrofuran was distilled into the flask; then 1.4 ml. (0.012 mole) of α-methylstyrene was added, also by distillation. Following these additions, the mixture was allowed to warm to room temperature with stirring. Formation of a disodium α-methylstyrene tetramer was indicated by the appearance of a red color. Isoprene (6.8 g., 0.1 mole) was then distilled into the mixture whereupon the red color of the initiator changed to a yellow-red. The reaction mixture was again cooled to $-78°$ C. by means of a solid carbon dioxide-acetone bath, and then 2 g. of pivalolactone was distilled into the reaction mixture. As the pivalolactone reacted, the yellow-red color of the mixture disappeared and a jelly-like material formed. After standing overnight, the reaction mixture was poured into methanol. A white polymer amounting to about 8 g. was separated and dried. The inherent viscosity of a 0.25 solution of this polymer in benzene at 25° C. was 0.44. A tough film was obtained by hot pressing.

EXAMPLE 8

Polypivalolactone-polyisoprene-polypivalolactone (Pivalolactone)$_{20}$(isoprene)$_{640}$(pivalolactone)$_{20}$ In this experiment a small amount of α-methylstyrene was used to prepare the Szwarc living polymer initiator. It shows that products containing only a small amount of pivalolactone have appreciable strength.

The polymerization was carried out as in Example 7. Dry tetrahydrofuran (about 200 ml.) was added to a flask on the walls of which a sodium mirror had previously been deposited and kept in vacuum. The flask was cooled with liquid nitrogen and the tetrahydrofuran distilled into it. α-Methylstyrene, 50 μl., was added by means of a syringe through a side arm fitted with a serum stopper. After the initiator had been formed, as indicated by development of a deep red color in the solution, 13.6 g. of dry isoprene was allowed to distill into the reaction mixture. The mixture was stirred for ½ hour at room temperature, and 5 ml. of pivalolactone was added by means of a syringe. After further stirring for 30 min., the reaction mixture was poured into an excess of methanol from which a soft polymer precipitated that after drying weighed 14.5 g. This product contained pivalolactone, as indicated by absorption of C=O in the infrared. It contained 85.77% carbon and 11.56% hydrogen, from which by diffference it is estimated the oxygen content was 2.66%. This analysis corresponds to an isoprene/pivalolactone molar ratio of about 16/1.

Osmotic measurements indicate $M_N$ of 45,000, and DTA indicated a glass transition temperature of $-2°$ C.. A tough, transparent film was obtained by hot pressing. Stress-strain examination indicated a tensile strength of 48.8 and 52.2 p.s.i. at elongations of 436% and 300%.

EXAMPLE 9

Polystyrene-polysisoprene-polypivalolactone (A) Dry n-hexane (200 ml.) was distilled into an evacuated 300 ml. reaction flask cooled in liquid nitrogen, and 2 ml. of pure dry styrene was added, also by distillation. The solution was allowed to warm to room temperature, and 0.1 ml. of a 1.6 molar solution of n-butyllithium in n-hexane was introduced. The mixture acquired a bright yellow color within a few minutes. It was stirred for 2 hours, during which time it became slightly viscous and turbid. The reaction mixture was again cooled in liquid nitrogen, and about 11-12 ml. of dry isoprene was introduced by distillation. The mixture was stirred overnight at room temperature, and it became quite viscous and yellow in color. Finally, a solution of 1.0 ml. of pivalolactone in 5 ml. of n-hexane was added and the mixture stirred for an additional hour. The reaction mixture was now added to a large volume of methanol, and a soft solid polymer was separated. The polymer was dried under vaccum at about 50° C.; it weighed 6.0 g. Infrared analysis of the polymer showed carbonyl absorption of low intensiy and evidence of more 1,4-isoprene structural units than 3,4 units. A hot-pressed film of the polymer was elastic and had good resilience.

(B) The preparation described above was repeated, except that tetrahydrofuran was added after the introduction of pivalolactone. The resulting polymer was similar to that described above, but it appeared somewhat tougher.

UTILITY

As illustrated in the examples, all the block copolymers of this invention in uncured form are sufficiently thermoplastic to be converted into homogeneous self-supporting films under heat and pressure. The films are useful for wrapping and packaging. Thus the stiffer, more rigid polymers (containing higher proportions of polystyrene and/or polypivalolactone) can be formed into tough, thin-walled, translucent or transparent molded boxes. Films of the more elastic polymers (containing higher proportions of polydiene) are used in the form of bags or sheeting for covering and protecting irregularly shaped or flexible objects.

All the block copolymers of this invention, however, contain unsaturation in the B units and may be cured by conventional means. For example, by incorporating into the polymer minor proportions of zinc oxide, sulfur, stearic acid, mercaptobenzothiazole and benzothiazolylnisulfide and heating the mixture under pressure at 120-140° C. for an hour or more, cured polymers of increased tensile strength and reduced thermoplastically are obtained through crossliinking.

Since obvious modifications and equivalents in the invention will be evident to those skilled in the chemical arts, I proposed to be bound solely by the following claims.

The embodiments of the invention in which an exclusive property or privilege is claimed are defined as follows:

1. A three-segment block copolymer having the general configuration $A_l$-$B_m$-$C_n$, wherein:

$A_l$ is a polypivalolactone or polystyrene segment of the compolyer, $B_m$ is a polybutadiene or polyisoprene segment of the copolymer, $C_n$ is a polypivalolactone segment of the copolymer, and $l$, $m$ and $n$ are integers representing the number of monomeric units A, B, and C in the respective segmens, $l$ and $n$ lying between 5 and 1000, inclusive, and $m$ lying between 10 and 6000, inclusive, the ratios $l:m$ and $n:m$ being in the range 1:2 to 1:60.

2. A block copolymer according to claim 1 having the configuration polypivalolactone-polyisoprene-polypivalolactone.

3. The block copolymer of claim 2 in which the polyisoprene segment is of at least 90% cis-1,4-structure.

4. A block copolymer according to claim 1 having configuration polypivalolactone-polybutadiene-polypivalolactone.

5. A block copolymer according to claim 1 having the configuration polystyrene-polyisoprene-polypivalolactone.

6. The process of preparing a block copolymer of claim 2 which comprises (1) polymerizing butadiene or isoprene with lithium or sodium metal or metal alkyl or a di(lithium) or di(sodium) α-methylstyrene tetramer in the proportion of 0.00017 to 0.05 mole equivalent of metal per mole of diene monomer, thereby forming a diene polymer segment with lithium or sodium at each end of the polymer chain; and (2) adding pivalolactone in the proportion of 0.033 to 1.0 mole per mole of diene monomer to the product of step (1) and thereby polymerizing the pivalolactone at the two ends of the diene chain.

7. The process of claim 6 in which step (1) is accomplished with lithium metal in the absence of a solvent.

8. The process of claim 6 in which step (1) is accomplished with lithium metal or dilithium α-methylstyrene tetramer in a nonpolar solvent.

9. The process of claim 6 in which step (2) is accomplished in a polar solvent added after the addition of pivalolactone.

10. The process of preparing a block copolymer of claim 5 which comprises:
   (1) polymerizing styrene with a lithium or sodium alkyl initiator and thereby forming a styrene polymer segment with lithium or sodium at one end of the polymer chain;
   (2) adding butadiene or isoprene to the product of step (1) and thereby forming a diene polymer segment with lithium or sodium at the free end of the diene chain; and
   (3) adding pivalolactone to the product of step (2) and thereby polymerizing the pivalolactone at the end of the diene chain.

11. A manufacture formed from a block copolymer of claim 1.

12. A film formed from a block copolymer of claim 1.

13. A film formed from a block copolymer of claim 3.

14. A film formed from a block copolymer of claim 4.

References Cited

UNITED STATES PATENTS

| | | | |
|---|---|---|---|
| 3,149,182 | 9/1964 | Porter | 260—879 |
| 3,312,753 | 4/1967 | Bailey et al. | 260—823 |
| 3,412,073 | 11/1968 | Jones | 260—78.3 |
| 3,492,369 | 1/1970 | Naylor | 260—879 |

OTHER REFERENCES

Nobutoki et al., "Bulletin of the Chemical Society of Japan," 40(8) pp. 1741–1745 (1967).

JOSEPH L. SCHOFER, Primary Examiner

R. A. GAITHER, Assistant Examiner

U.S. Cl. X.R.

260—874, 880, 887